United States Patent Office 2,798,684
Patented July 9, 1957

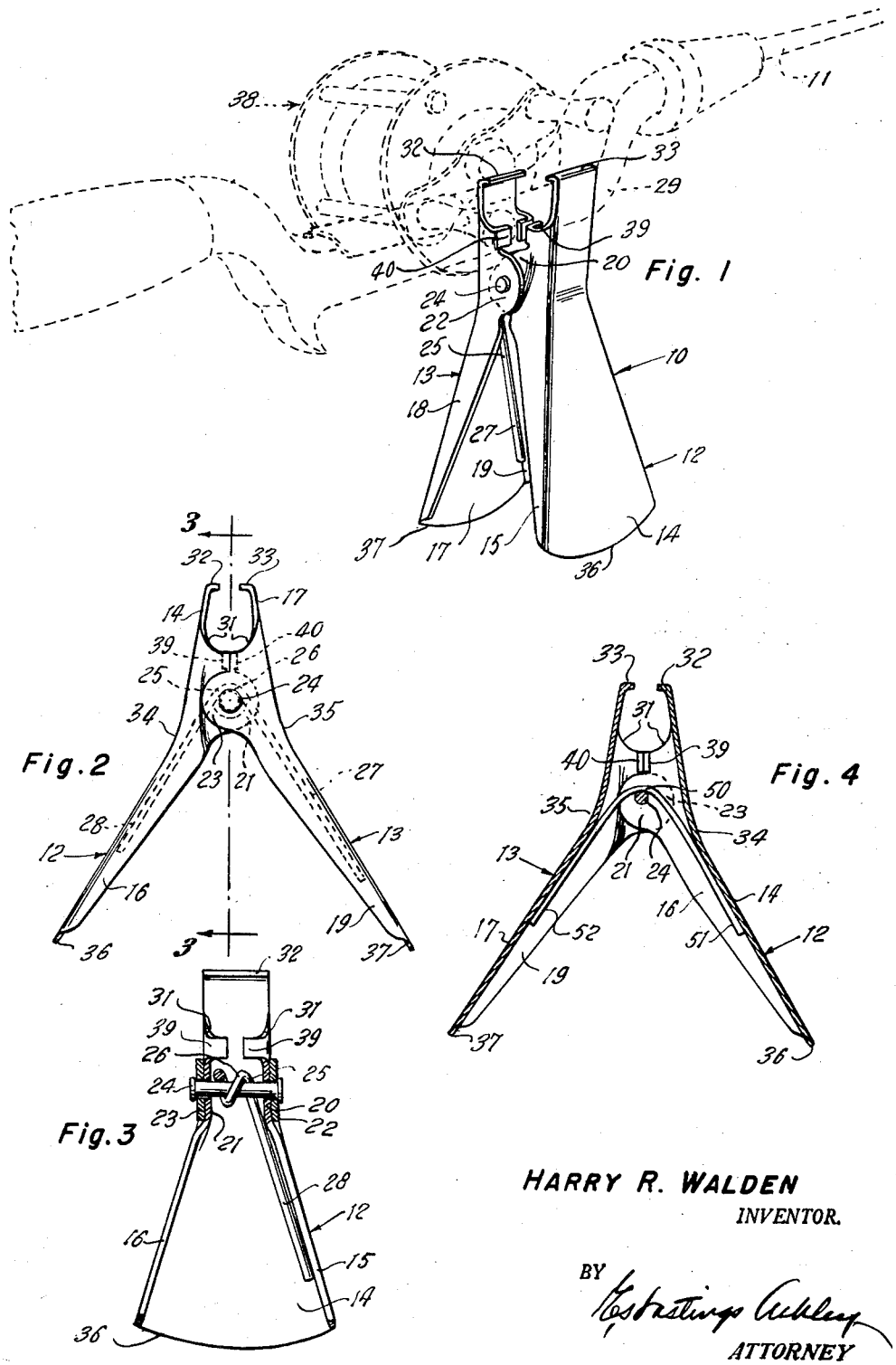

2,798,684

CASTING OR FISHING ROD SUPPORTS

Harry R. Walden, Dallas, Tex.

Application August 25, 1952, Serial No. 306,083

1 Claim. (Cl. 248—47)

This invention relates to a casting or fishing rod support and more particularly to a clip attachable to the reel seat of a fishing rod for supporting the rod in operative fishing position.

Fishing rods are often employed in trolling and in still line fishing in which the bait or lure is cast very seldom so that the fisherman becomes fatigued holding the casting rod motionless for prolonged periods of time. Moreover, the fisherman may need to perform other acts connected with his fishing which require the use of both his hands. It is desirable, therefore, to provide a support for the rod for holding the rod in proper fishing position on the ground or on the seat of a boat. The support must be adapted to be easily and quickly attached to the rod, must be capable of firmly holding the rod in a tilted position, and must be of such structure and of such light weight that the support will not interfere unduly with normal use of the rod if the rod is picked up while the support is still attached to it.

Accordingly, it is one object of the invention to provide a new and improved support for a casting rod for holding the rod in a tilted position, and with the reel in upright operative position ready for use when picked up by the user.

It is another object of the invention to provide a new and improved support for a fishing rod which can be easily and quickly attached to and detached from the fishing rod.

It is an important object of the invention to provide a support for fishing rods having arced seat or ground contacting surfaces so that the rod may be firmly supported regardless of variations in the location of the point of attachment of the support on the rod.

Further objects and advantages of the invention will readily be apparent from the reading of the following description of devices constructed in accordance with the invention, and reference to the accompanying drawings thereof, wherein:

Figure 1 is a perspective view of the support showing it in position attached to the reel seat of a fishing rod, Figure 2 is a side elevation of the support, Figure 3 is a vertical sectional view taken on the line 3—3 of Figure 2, and Figure 4 is a vertical sectional view showing a modified form of the support.

Referring now to the drawings, the reference numeral 10 designates generally a support for holding a fishing rod 11 in proper tilted position. The support comprises a pair of identical elongate support members 12 and 13. The support members 12 and 13 are of substantially channel form, the support member 12 having a web 14 and a pair of flanges 15 and 16 and the member 13 having a web 17 and flanges 18 and 19. The flanges 15 and 16 of the first support member 12 are provided with ears 20 and 21, respectively, which are disposed between and abut the ears 22 and 23, respectively, of the flanges 18 and 19 of the second support member 13. The ears of the support members are provided with registering apertures through which a pin 24 extends, so that the two support members are pivotally connected to each other. The outer ends of the pivot pin may be peened in order to prevent the pin from being displaced from the apertures of the ears.

A spring 25 has at least one turn 26 disposed about the pivot pin and elongate swingable ends 27 and 28 which abut the webs 14 and 17, respectively, of the two support members to bias the lower outer ends of the supports apart and the upper ends of the supports toward one another. The upper portions of the flanges are cut away arcuately, as at 31, and the upper ends of the webs 14 and 17 are bent inwardly to form inturned holding tips 32 and 33, respectively. It will be apparent that the tips 32 and 33 are arranged to overlie the upper surface of the reel seat 29 of the fishing rod 11 and the arcuate edges 31 of the flanges are spaced from the lower surface of the reel seat so that the support may fit rods of different sizes and construction. The force exerted by the spring will cause the reel seat to be held firmly in the angle between the inturned tips 32 and 33 and their respective webs. The angular shape of the inturned tips enables the support to be used on reel seats of different dimensions, the inturned tips and webs being clearly adapted to engage reel seats of different thicknesses.

The lower portions or legs of the support members 12 and 13 below the pivot pin 24 are turned outwardly away from each other, as at 34 and 35, in order that the lowermost edges 36 and 37 of the webs 14 and 17 may be spaced far apart from one another to give greater stability to the support. These edges and the butt end of the fishing rod are the three points of contact with the ground or the bottom or seat of the boat when in use, and the tripod formed by the butt of the fishing rod and the two support members 12 and 13 when the support is attached to the reel seat of the rod supports the fishing rod with the reel up in operative position and with the tip of the rod elevated. The lower edges 36 and 37 of the support members are arcuately shaped so that these edges will contact the various types of supporting surfaces on which they rest, regardless of the length of the butt end of the rod, or the exact point along the reel seat at which the support 10 is attached to the reel seat.

The support 10 may be easily and quickly attached to or detached from the reel seat 29 by grasping the lower portions or legs of the support members and pressing them together to pivot the support members about the pin 24 and move the inwardly turned tips 32 and 33 away from each other. It will be apparent that the weight of the butt end of the rod and the weight of the reel 38 will cause the rod to assume a tilted position with the tip end of the rod in elevated position when the support 10 is attached to the reel seat as shown in Figure 1 and the rod and support rest on the ground or bottom of the boat or other supporting surface.

The flanges of the support members 12 and 13 may be provided with stops 39 and 40, respectively, formed by turning in extensions of the flanges located immediately above the ears on such flanges. The stops 39 and 40 abut each other to limit inward movement of the upper ends of the support members due to the force exerted by the spring. The provision of the stops limits the outward swinging movement of the lower portions of the arms and thus reduces the space required for storing the supports in transit or storage.

In Figure 4 is shown a modified form of the support which differs from the support shown in Figures 1 to 3 in that the coiled spring 26 is replaced by a leaf spring 50 whose central portion extends over the pin 24 and whose elongate swingable ends 51 and 52 abut the webs 14 and 17 of the support members. The pin 24 prevents the leaf spring from being displaced downwardly.

It will be seen now that the support 10 may be easily attached to the reel seat of a fishing rod by pivoting the support members 12 and 13 to separate the upper ends so that they may be fitted over the reel seat and that the spring ends 27 and 28 will cause the upper ends to clamp or clip firmly on the reel seat. It will also be seen that the butt end of the fishing rod and the two support members form a tripod which firmly folds the fishing rod in a tilted position with the rod tip in an elevated position, which is the proper position the rod should assume in still line fishing or trolling. Moreover, it will be evident that the lower portions or arms of the support members are bent outwardly to space widely the rest edges 36 and 37 and afford greater stability to the support. Furthermore, it will be seen that the edges 36 and 37 are arcuate in form so that regardless of the angle of tilt of the rod, the arcuate edges will always firmly contact the ground or other surface on which the rod and support are disposed.

It will also be seen that since the support 10 is very light in weight and is disposed on the reel seat below the reel and on the side of the reel seat remote from the handle or butt end of the rod, the rod may be picked up and used to cast the bait or lure as if the support were not attached to the rod, since the support will not interfere with the operation of the reel and will be so located that the fisherman's hands are not likely to contact it in normal fishing operations.

The foregoing description of the invention is explanatory only, and changes in the details of the construction illustrated may be made by those skilled in the art, within the scope of the appended claim, without departing from the spirit of the invention.

What I claim and desire to secure by Letters Patent is:

A support for fishing rods comprising: a pair of elongate support members, each of said support members having a web and a pair of spaced lateral flanges integral with said web, the flanges of each support member having ears disposed intermediate the ends of the support member, said support members being disposed with their flanges extending inwardly toward the opposite support member and with the ears in overlapping relationship; a pivot pin extending through said ears and pivotally connecting said support members for pivotal movement about said pivot pin; said webs having upper end portions extending inwardly toward each other in confronting relationship to provide holding tips adapted to engage over the reel seat portion of a fishing rod, said flanges of each support member above the ears having upper edges curved upwardly and toward the web of the support member and terminating short of the inwardly extending holding tips to provide clearance for the reel seat portion of the rod and permit said holding tips to readily engage over said reel seat; said support members each having its web portion below the ears inclined outwardly at an angle with respect to the web thereabove, the width of said web being gradually increased from adjacent said ears to its lower end, said lower end of said web being convexly curved; said pivot pin connecting said support members being located substantially closer to said holding tips than to said lower curved end of said web whereby said lower web portions are substantially longer than said web portion above said ears; means biasing the lower ends of said support members apart and said inwardly extending holding tips toward each other; and stop means on the lateral flanges of each of said support members above said ears and below said curved upper edges of said flanges in the form of integral members extending inwardly from each flange toward the opposite flange, said stop means on one of said support members being adapted to abut the stop means on the other support member for limiting movement of said holding tips toward each other.

References Cited in the file of this patent

UNITED STATES PATENTS

| | | |
|---|---|---|
| 271,562 | Worthley | Jan. 30, 1883 |
| 289,153 | Smith | Nov. 27, 1883 |
| 955,257 | Fridell | Apr. 19, 1910 |
| 1,152,739 | Krementz | Sept. 7, 1915 |
| 1,181,533 | Kraft | May 2, 1916 |
| 1,385,472 | Renn | July 26, 1921 |
| 2,263,554 | Brach | Nov. 25, 1941 |
| 2,553,070 | Van Megroot | May 15, 1951 |
| 2,584,543 | Brown | Feb. 5, 1952 |
| 2,603,849 | Epperson | July 22, 1952 |

FOREIGN PATENTS

| | | |
|---|---|---|
| 161,291 | Switzerland | Apr. 30, 1933 |
| 242,634 | Switzerland | Oct. 16, 1946 |